US012657625B2

(12) United States Patent
Ishida

(10) Patent No.: US 12,657,625 B2
(45) Date of Patent: Jun. 16, 2026

(54) PAY-BY-THE-HOUR FACILITY

(71) Applicant: TAISHO SKY BUILDING, INC., Tokyo (JP)

(72) Inventor: Kazuharu Ishida, Tokyo (JP)

(73) Assignee: TAISHO SKY BUILDING, INC., Tokyo (JP)

( * ) Notice: Subject to any disclaimer, the term of this patent is extended or adjusted under 35 U.S.C. 154(b) by 243 days.

(21) Appl. No.: 17/660,902

(22) Filed: Apr. 27, 2022

(65) Prior Publication Data

US 2022/0253927 A1      Aug. 11, 2022

Related U.S. Application Data

(63) Continuation of application No. PCT/JP2019/042727, filed on Oct. 31, 2019.

(51) Int. Cl.
*G06Q 30/0645*        (2023.01)
*G06Q 10/02*        (2012.01)
(Continued)

(52) U.S. Cl.
CPC ......... *G06Q 30/0645* (2013.01); *G06Q 10/02* (2013.01); *G06Q 30/0283* (2013.01); *G07B 15/02* (2013.01); *G07C 9/00904* (2013.01)

(58) Field of Classification Search
CPC ............... G06Q 30/0645; G06Q 10/02; G06Q 30/0283; G07B 15/02; G07C 9/00904
See application file for complete search history.

(56) References Cited

U.S. PATENT DOCUMENTS 10,308,218 B2    6/2019  Golduber
10,981,541 B2    4/2021  Golduber
(Continued)

FOREIGN PATENT DOCUMENTS

CN        105117961  A      12/2015
JP        2002-150178  A      5/2002
(Continued)

OTHER PUBLICATIONS

Naples Daily News, "Associations can stop delinquent owners from using community amenities and collect rent," Naples, Feb. 2, 2014, p. R.3.*

(Continued)

*Primary Examiner* — Nathan Erb
(74) *Attorney, Agent, or Firm* — MORGAN, LEWIS & BOCKIUS LLP

(57)                    ABSTRACT

An on-demand rental facility that can improve operational efficiency of a facility by improving convenience for a reservation person wherein a management server for managing information of the on-demand rental facility includes: a reservation manager that receives a reservation from a reservation person; a storage unit that stores reservation information on the reservation person and reservation date and time of a room and a parking lot 26 received by the reservation manager; a reservation person common key setting part that sets a reservation person unlocking key common to the room and the parking lot associated with the reservation information; and a reservation person key issuer that issues the set reservation person unlocking key to the reservation person. The reservation person can unlock the room and the parking lot by using the reservation person unlocking key, and the convenience for the reservation person can be improved.

7 Claims, 4 Drawing Sheets

```
        START
          │
 RECEIVE NEW RESERVATION        ST11
          │
INPUT EVENT HOLDING INFORMATION  ST12
          │
  REGISTER PROVIDED             ST13
   ITEM INFORMATION
          │
 RECEIVE USER INFORMATION        ST14
          │
     NOTIFY USER                 ST15
          │
  RECEIVE APPLICATION            ST16
   FOR PROVIDED ITEM
          │
 RECEIVE AND VIEW MESSAGE        ST17
          │                      ST18
   RECEPTION END?  ─── NO
          │ YES
FIX EVENT HOLDING INFORMATION    ST19
          │
 SET ALLOCATION INFORMATION      ST20
          │
NOTIFY ALLOCATION INFORMATION    ST21
          │
  ISSUE UNLOCKING KEY            ST22
          │
     HOLD EVENT                  ST23
          │
CALCULATE AND CHARGE USAGE FEE   ST24
          │
  DIFFERENCE SETTLEMENT          ST25
          │
        END
```

(51) Int. Cl.
    *G06Q 30/0283*     (2023.01)
    *G07B 15/02*     (2011.01)
    *G07C 9/00*     (2020.01)

(56)           References Cited

U.S. PATENT DOCUMENTS

| | | | |
|---|---|---|---|
| 2007/0197247 A1* | 8/2007 | Inselberg | G06Q 30/02 |
| | | | 455/517 |
| 2018/0154867 A1 | 6/2018 | Golduber | |
| 2018/0330295 A1 | 11/2018 | An | |
| 2019/0241155 A1 | 8/2019 | Golduber | |
| 2020/0077243 A1* | 3/2020 | Heller | G06Q 30/06 |

FOREIGN PATENT DOCUMENTS

| | | |
|---|---|---|
| JP | 2002-279360 A | 9/2002 |
| JP | 2006-107306 A | 4/2006 |
| JP | 2011-008747 A | 1/2011 |
| JP | 2019-502220 A | 1/2019 |
| WO | WO2016/201355 A1 | 12/2016 |

OTHER PUBLICATIONS

Taisho Sky Building, Inc., International Search Report and Written Opinion dated Jan. 28, 2020 filed in PCT/JP2019/042727, 13 pgs.

Notice of Reasons for Refusal mailed on Jul. 7, 2020 for the corresponding Japanese Patent Application No. 2020-512070, 13 pgs.

Office Action issued on Apr. 30, 2021 for the corresponding Taiwanese Patent Application No. TW109137491, 10 pgs.

Office Action issued on Nov. 1, 2021 for the corresponding Taiwanese Patent Application No. TW109137491, 8 pgs.

Office Action issued on Jun. 23, 2022 for the corresponding Taiwanese Patent Application No. TW109137491, 4 pgs.

\* cited by examiner

34

RESERVATION PERSON COMMON KEY SETTING PART    341

RESERVATION PERSON KEY ISSUER    342

USER COMMON KEY SETTING PART    343

USER KEY ISSUER    344

PAY-BY-THE-HOUR FACILITY

RELATED APPLICATIONS

The present application is a continuation of International Patent Application No. PCT/JP2019/042727, filed Oct. 31, 2019, which is hereby incorporated by reference in its entirety.

TECHNICAL FIELD

This disclosure relates to an on-demand reservation system for setting a usage time and renting a facility to a user.

BACKGROUND

A system for renting rooms of a building (e.g., an office, a hotel, or the like) to users typically includes a management server open to a communication network such as the Internet, and a plurality of reservation servers in which information on the conference room is stored. Such a system is typically configured so that users can access information of the conference room in a reservation server via the management server and reserve a desired conference room. Such a system also typically has a billing function so that a rental fee can be paid online.

However, some conventional systems require the person in charge of the reservation (a room reservation person) to receive, at the time of use, a key for unlocking the reserved room and a key for unlocking another facility (e.g., a warehouse) attached to the reserved room by other means different from the reservation system. Therefore, the reservation person is required to receive and return the keys for the room and the other facility, which is inconvenient for the reservation person. As a result, operational efficiency of the rental facility may be reduced.

SUMMARY

An object of the present disclosure is to provide an on-demand reservation system (also referred to as a rental facility) that improves convenience for the reservation person, thereby improving operational efficiency of the rental facility.

The on-demand rental facility of the present disclosure is an on-demand rental facility in which a usage time is set and a facility is rented, in which the facility includes at least a first facility and a second facility different from the first facility, the on-demand rental facility includes a management server for managing information on the first facility and the second facility, and the management server is connected via a communication line to a reservation person input unit that receives information input from a reservation person of the first facility and the second facility to the management server, and includes: a reservation manager that receives a reservation from the reservation person via the reservation person input unit; a storage that stores reservation information on the reservation person and reservation date and time of the first facility and the second facility received by the reservation manager; a reservation person common key setting part that sets a reservation person unlocking key common to the first facility and the second facility associated with the reservation information; and a reservation person key issuer that issues the reservation person unlocking key set in the reservation person common key setting part to the reservation person.

According to the present disclosure as described above, the management server includes the reservation person common key setting part that sets the reservation person unlocking key common to the first facility and the second facility associated with the reservation information, and the reservation person key issuer that issues the reservation person unlocking key set in the reservation person common key setting part to the reservation person, so that the reservation person can unlock the first facility and the second facility by using the reservation person unlocking key, and the convenience for the reservation person can be improved. Thus, the reservation person does not have to separately receive a first unlocking key corresponding to the first facility and a second unlocking key corresponding to the second facility, and can relatively easily reserve the facility, and the operational efficiency of the facility can be improved.

At this time, in the present disclosure, the management server preferably includes a fee billing part that charges the reservation person for a total usage fee of the first facility and the second facility.

With such a configuration, the management server includes the fee billing part that charges the reservation person for the total usage fee of the first facility and the second facility, so that the reservation person can pay the total usage fee of the first facility and the second facility in a lump sum.

Further, in the present disclosure, it is preferred that the facility includes a third facility different from the first facility and the second facility, the management server is connected via a communication line to a user input unit that receives information input to the management server by a user who is a user of the first facility related to the reservation information stored in the storage and is different from the reservation person, and the management server causes the storage to store user information on a user of the third facility by receiving a reservation of the third facility via the user input unit, and includes: a user common key setting part that sets a user unlocking key common to the first facility and the third facility associated with the reservation information and the user information; and a user key issuer that issues the user unlocking key set in the user common key setting part to the user.

With such a configuration, the management server includes: the user common key setting part that sets the user unlocking key common to the first facility and the third facility associated with the reservation information and the user information; and the user key issuer that issues the user unlocking key set in the user common key setting part to the user, so that the reservation person can unlock the first facility and the second facility by using the reservation person unlocking key, and the user can unlock the first facility and the third facility by using the user unlocking key.

Further, in the present disclosure, it is preferred that the management server is connected via a communication line to a user input unit that receives information input to the management server by a user who is a user of the first facility related to the reservation information stored in the storage and is different from the reservation person, the reservation manager includes: a reservation person receiver that receives event holding information on a reservation date and time and a reserved location of an event to be held using the first facility from the reservation person via the reservation person input unit, and causes the storage to store the received event holding information; and a user receiver that receives user information on the user of the event related to the event holding information via the user input unit, to cause the storage to store the user information, and the management server includes a user notifier that notifies the user that the user information has been received.

With such a configuration, the management server includes: the user receiver that receives the user information on the user of the event to be held using the first facility, to cause the storage to store the user information; and the user notifier that notifies the user that the user information has been received, so that the user can directly register the user information to the event to be held by using the first facility. Thus, the reservation person does not need to determine the number of users at the time of reservation, and can relatively easily reserve the facility even when the number of users cannot be predicted. Further, when the user applies for participation in the event via the user input unit, the user can receive the notification from the user notifier of the management server. Therefore, the on-demand rental facility can receive positive holding of the event by the reservation person by improving the convenience for both the reservation person and the user, and can improve the operational efficiency of the facility by enhancing motivation of the users to participate in the event.

In this case, in the present disclosure, the management server preferably includes a location information notifier that notifies the user of location information related to a reserved location included in the event holding information stored in the storage.

With such a configuration, the management server includes the location information notifier that notifies the user of the location information related to the reserved location included in the event holding information stored in the storage, so that the user can easily reach the reserved location on the basis of the location information.

Further, in the present disclosure, the management server preferably includes: a registration receiver that receives registration of provided item information on provided item to be provided at the event related to the event holding information via the reservation person input unit, to cause the storage to store the provided item information; and an application receiver that receives an application for use of the provided item related to the provided item information via the user input unit.

With such a configuration, the management server includes a registration receiver that receives the registration of the provided item information and the application receiver that receives the application for the use of the provided item, so that the reservation person can register the provided item to be provided to the user, and the user can apply for the use of the provided item.

Further, in the present disclosure, the management server preferably includes: a reservation person side receiver that receives a message of the reservation person via the reservation person input unit; a user side receiver that receives a message of the user via the user input unit; and a message viewer that allows both the reservation person and the user to view the message received by the reservation person side receiver and the user side receiver.

With such a configuration, the management server includes the message viewer that allows both the reservation person and the user to view the message received by the reservation person side receiver and the user side receiver, so that the reservation person and the user can interact with each other by exchanging messages via the management server.

Further, in the present disclosure, the management server preferably includes a usage fee billing part that charges a usage fee for each user with respect to users of the event related to the event holding information.

With such a configuration, the management server includes the usage fee billing part that charges the usage fee of the event for each user with respect to the users of the event, so that the reservation person can save time and effort of individually billing the user.

DETAILED DESCRIPTION

Hereinafter, an embodiment of the present disclosure will be described with reference to the drawings.

Figure 1:
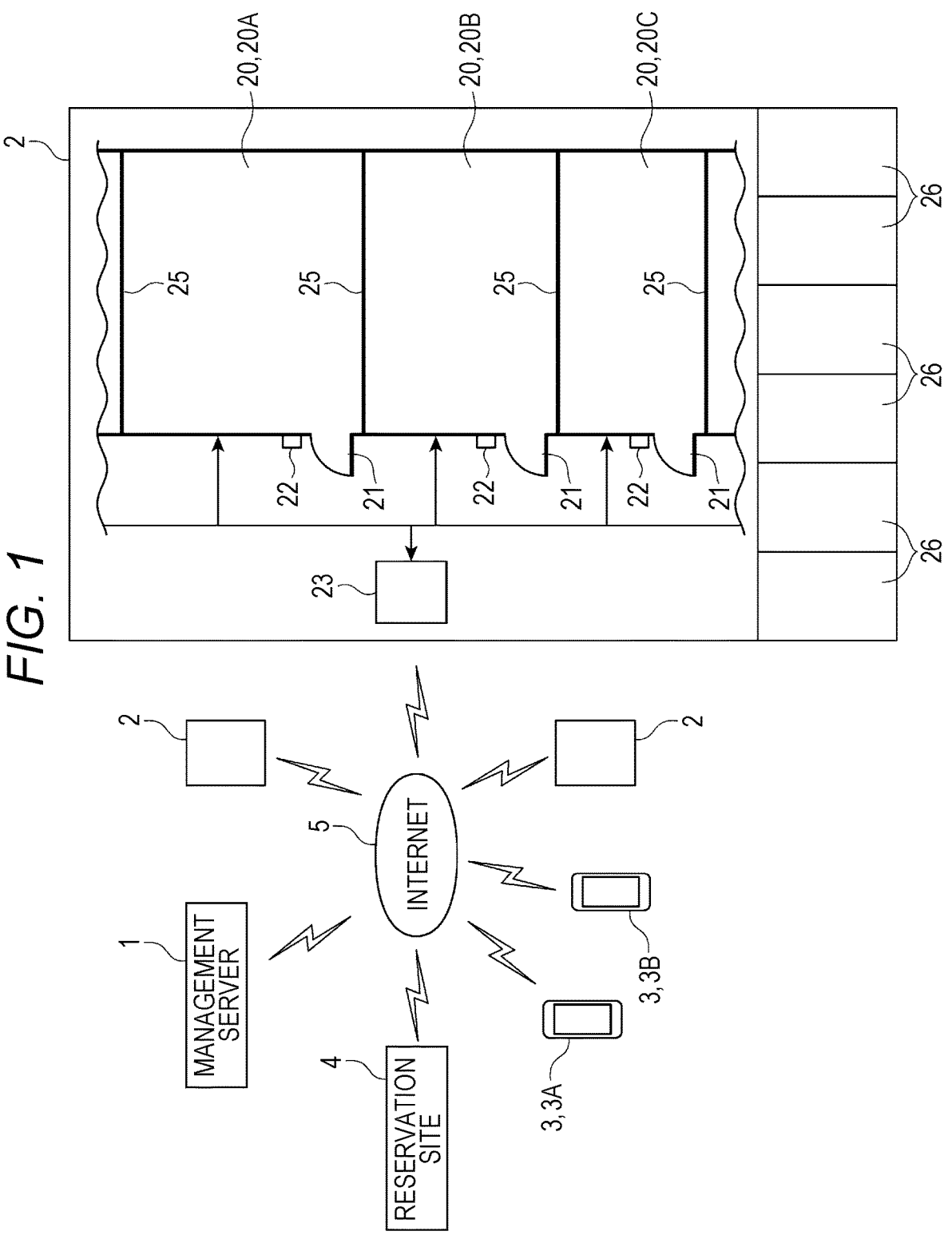
FIG. 1 is a schematic configuration diagram of an on-demand rental facility according to an embodiment of the present disclosure.

FIG. 1 is a schematic configuration diagram of an on-demand rental facility according to the embodiment of the present disclosure.

The on-demand rental facility of the present embodiment is a rental space in which a usage time is set and a facility is rented to a user, and includes a management server 1 for managing the rental space and a plurality of rooms 20 which is a facility to be rented to the user, as illustrated in FIG. 1, and there is a plurality of buildings 2 having the plurality of rooms 20. The management server 1 and the building 2, a terminal device 3 such as a mobile phone, a smartphone, and a personal computer owned by a reservation person and the user, and a reservation site 4 for applying for use of the room 20 can be connected to each other via the Internet 5 which is a public network as a communication line.

The reservation person who intends to reserve the room 20 and hold an event can access the management server 1 via the Internet 5 using a terminal device 3A as a reservation person input unit, search for the room 20 according to a purpose, and reserve the room 20 by designating the usage time, the number of users, and the like. The user who intends to participate in the event can access the reservation site 4 via the Internet 5 using a terminal device 3B as a user input unit and apply for participation in the event. Upon receiving an application from the user, the reservation site 4 transmits reservation information from the terminal device 3B to the management server 1.

The building 2 includes the rooms 20 such as a conference room and a training room, and each room 20 is provided with a doorway 21 and a locking device 22 for locking and unlocking the doorway 21. The locking device 22 can be unlocked by an unlocking key such as a password or a bar code issued from the management server 1 to the terminal device 3 of the reservation person and the user, and the unlocking key is randomly changed each time it is used, so that only the reservation person who made a reservation at that time and the user can unlock the locking device 22 by using a unique unlocking key. A communication terminal device 23 such as a modem or a router is connected to each room 20 via a local area network (LAN), and the communication terminal device 23 is connected to the management server 1 via the Internet 5. The rooms 20 of the building 2 are partitioned by partition walls 25, and there are a relatively large room 20A, an intermediate size room 20B, and a relatively small room 20C. Note that in the present embodiment, the password, the bar code, or the like is used as an unlocking key, but for example, biometric authentication such as face authentication, fingerprint authentication, or retina authentication may be used, and any one can be used as long as the locking device 22 can be unlocked.

Further, a plurality of parking lots 26 is provided outside the building 2. In the present embodiment, the rooms 20 are first facilities in which the event organized by the reservation person and the user participates in is performed, and the parking lots 26 are second facilities that can be used by the reservation person, and are also third facilities that can be used by the user. Each of the parking lots 26 is provided with a parking restriction device (lock) such as a gate, a car stop pole, a warning light, and a warning buzzer, and the parking lot cannot be used unless the parking regulation device is unlocked by the unlocking key. Further, the parking regulation device is connected to the management server 1 via the communication terminal device 23, and is configured so that the unlocking key is set by the management server 1. Like the unlocking key of the locking device 22, the unlocking key is issued from the management server 1 to terminal devices 3 of the reservation person and the user, and can be used only during an event holding time of date of the event. Note that the second and third facilities are not limited to the parking lot 26, but may be warehouses, lockers, shower rooms, toilets, beverage servers, various electronic devices, training devices, or the like, appropriate usage restriction devices (locks) are respectively provided for them, and any one may be provided as far as the unlocking key can be set by the management server 1.

Figure 2:
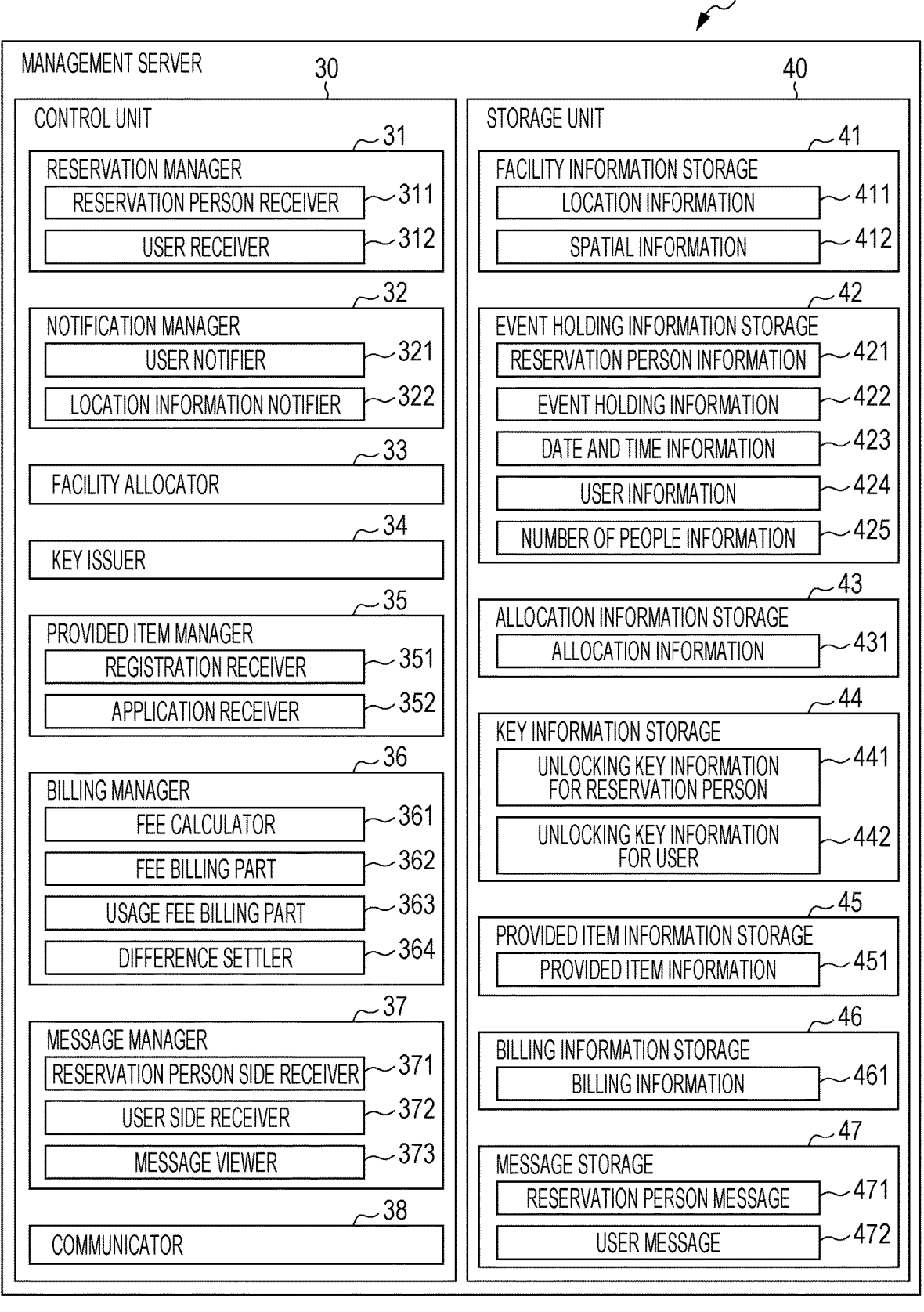
FIG. 2 is a block diagram illustrating a configuration of a management server of the on-demand rental facility in accordance with some implementations.

FIG. 2 is a block diagram illustrating a configuration of the management server of the on-demand rental facility.

The management server 1 includes a server device, and as illustrated in FIG. 2, includes a control unit 30 including a central processing unit (CPU) and the like, and a storage unit (storage) 40 including a storage device such as a hard disk drive (HDD). The control unit 30 includes a reservation manager 31 that manages the reservation information reserved by the reservation person, a notification manager 32 that manages various notifications to the terminal device 3, a facility allocator 33 that allocates the room 20 to be rented on the basis of the reservation information, a key issuer 34 that issues the unlocking key for unlocking the locking device 22 for the room 20 and the parking lot 26 to the reservation person and the user, a provided item manager 35 that manages provision information on provided item to be provided at the event, a billing manager 36 that manages billing information such as a rental fee of the room 20 to be rented, a message manager 37 that manages exchange of messages between the reservation person and the user, and a communicator 38 that controls communication with the communication terminal device 23, the reservation site 4, and the terminal device 3.

The storage unit 40 includes a facility information storage 41 that stores information of all the rooms 20 and the parking lots 26 to be managed, an event holding information storage 42 that stores the event holding information of the event that uses the room 20, an allocation information storage 43 that stores allocation information of the room 20 with respect to the reservation, a key information storage 44 that stores information on the unlocking key to be issued to the reservation person and the user, a provided item information storage 45 that stores the provision information on the provided item to be provided at the event, a billing information storage 46 that stores the billing information such as the rental fee of the room 20 to be rented, and a message storage 47 that stores the messages exchanged between the reservation person and the user. The facility information storage 41 stores location information 411 indicating, for all the rooms 20 and the parking lots 26, an address, access information, and the like of the building 2 in which all the rooms 20 are provided, and a spatial information 412 indicating a room number, a size, use, an accessory device, or the like of each room 20. The spatial information 412 also includes parking lot information such as the number of parking lots 26 attached to the building 2 and parking lot numbers.

Note that the reservation manager 31, the notification manager 32, the facility allocator 33, the key issuer 34, the provided item manager 35, the billing manager 36, the message manager 37, and the communicator 38 may be executed as a program by the CPU of the server device, may be configured by independent devices, or may be configured using cloud computing. Further, the storage unit 40 may be configured by the storage device such as the HDD, or may use a storage unit of a cloud service. Furthermore, the terminal devices 3A and 3B that function as the reservation person input unit and the user input unit may be devices such as a smartphone including an input part that receives input from the reservation person and the user, a display for notifying the reservation person and the user of information, a communicator for transmitting and receiving the information to and from the management server 1, and a controller for controlling the input part, the display, the communicator, and the like, or may be devices in which the input part, the display, the communicator, and the controller are configured by the independent devices.

In the control unit 30, the reservation manager 31 includes a reservation person receiver 311 that receives the event holding information from the terminal device 3A of the reservation person, and a user receiver 312 that receives user information on the user of the event related to the event holding information via the terminal device 3B of the user. Regarding the received event holding information, the reservation person receiver 311 uses information on the reservation person as reservation person information 421, information on event content and the reserved room 20 as event holding information 422, and date and time of the event to be held as date and time information 423, and causes the event holding information storage 42 of the storage unit 40 to store the above information. The reservation person information 421 also includes information on whether the reservation person uses the parking lot 26. The user receiver 312 causes the event holding information storage 42 to store the received user information as user information 424, and causes the event holding information storage 42 to store the number of users who have been accepted to participate in the event as the number of people information 425. The user information 424 also includes information on whether the user uses the parking lot 26.

The notification manager 32 includes a user notifier 321 that notifies the user that the user information has been received, and a location information notifier 322 that notifies the user of the location information 411 relating to a location of the room 20 included in the event holding information 422. The location information notifier 322 generates a notification to the user on the basis of the location information 411 of the room 20, and transmits a notification of the location information to the terminal device 3B of the user via the communicator 38. The facility allocator 33 sets the allocation information of the room 20 on the basis of the event holding information 422 and the number of people information 425, and causes the allocation information storage 43 to store allocation information as allocation information 431. Further, the facility allocator 33 sets allocation information of the parking lot 26 on the basis of the event holding information 422, the spatial information 412, the reservation person information 421, and the user information 424, and causes the allocation information storage 43 to store these pieces of information in association with the allocation information 431 of the room 20. Then, the user notifier 321 generates notifications to the reservation person and the user on the basis of the allocation information 431 of the room 20, and transmits the notification of allocation of the room 20 to the terminal devices 3A and 3B of the reservation person and the user via the communicator 38.

Figure 3:
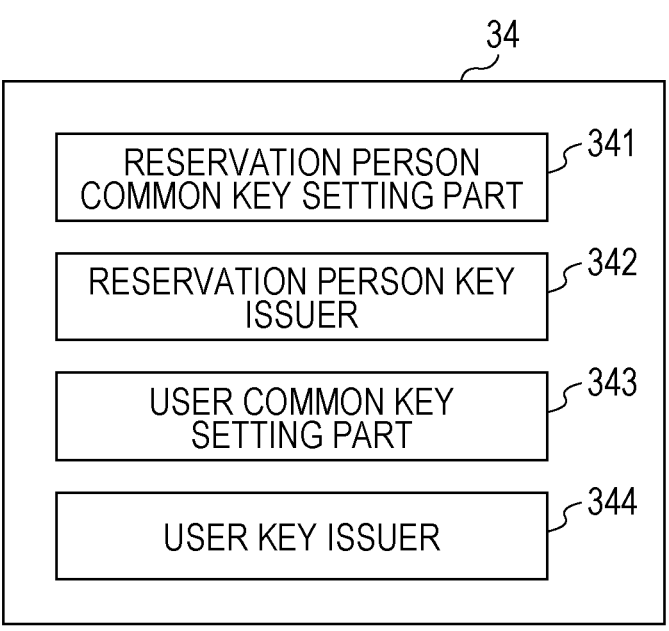
FIG. 3 is a diagram illustrating a configuration of a key issuer in the management server in accordance with some implementations.

FIG. 3 is a diagram illustrating a configuration of a key issuer in the management server.

As illustrated in FIG. 3, the key issuer 34 includes a reservation person common key setting part 341 that sets a reservation person unlocking key common to the locking device 22 for the room 20 and a reservation person parking lot 26, associated with the event holding information 422 that is the reservation information, and a reservation person key issuer 342 that issues the reservation person unlocking key set by the reservation person common key setting part 341 to the reservation person. Further, the key issuer 34 includes a user common key setting part 343 that sets the user unlocking key common to the locking device 22 for the room 20 and a user parking lot 26, associated with the event holding information 422 and the user information 424, and a user key issuer 344 that issues the user unlocking key set by the user common key setting part 343 to the user. Then, the key issuer 34 causes the key information storage 44 to store the issued reservation person unlocking key as unlocking key information 441 for the reservation person, and causes the key information storage 44 to store the issued user unlocking key as unlocking key information 442 for the user.

The key issuer 34 generates a notification to the reservation person on the basis of the unlocking key information 441 for the reservation person, transmits the reservation person unlocking key to the terminal device 3A of the reservation person via the communicator 38, and generates the notification to the user on the basis of the unlocking key information 442 for the user, and the user notifier 321 transmits the user unlocking key to the terminal device 3B of the user via the communicator 38. With the unlocking keys transmitted to the terminal devices 3A and 3B in this way, the reservation person can unlock the locking device 22 for the room 20 and the reservation person parking lot 26 by the common reservation person unlocking key. The user can unlock the locking device 22 for the room 20 and the user parking lot 26 by the common user unlocking key. On the other hand, the reservation person cannot unlock the user parking lot 26 by the reservation person unlocking key, the user cannot unlock the reservation person parking lot 26 by the user unlocking key, and they can use only the parking lots 26 that can be respectively available for them. That is, the unlocking key is set by a two-digit code corresponding to the locking device 22 for the room 20 and the parking lot 26, and unlockable and non-unlockable can be appropriately set by a combination of two-digit codes. For example, when the unlocking key code issued to the reservation person is "XA" and the unlocking key code issued to the user is "XB", the unlocking code of the locking device 22 for the room 20 which is the first facility is set as "X(ANY)", the unlocking code of the reservation person parking lot 26 which is the second facility is set as "XA" or "(ANY)A", and the unlocking code of the user parking lot 26 which is the third facility is set as "XB" or "(ANY)B".

As illustrated in FIG. 2, the provided item manager 35 includes a registration receiver 351 that receives registration of the provided item information on the provided item to be provided at the event via the terminal device 3A of the reservation person, and an application receiver 352 that receives an application for use of the provided item related to the provided item information via the terminal device 3B of the user. The registration receiver 351 causes the provided item information storage 45 to store the provided item information received from the reservation person as provided item information 451. Here, examples of the provided item include goods such as equipment used at the event, and electronic data that can be downloaded to the terminal device 3, and in the case of the goods, they may be delivered to the user in advance, or may be delivered to the room 20 to be used on the day of the event. In addition, the provided item may be sold or rented for a fee, or may be provided without a fee. Then, when the provided item is fee-based, the billing manager 36 may add a fee of the provided item to a usage fee of the event and charge the usage fee to the user, or charge the fee of the provided item to the user by a separate billing unit.

The billing manager 36 causes the billing information storage 46 to store various fees related to rental of the room 20 to be rented to the reservation person and the user as billing information 461. The billing manager 36 includes a fee calculator 361 that calculates the rental fee of the allocated room 20 and the usage fee of the parking lot 26, a fee billing part 362 that charges the reservation person for the rental fee of the room 20 and the usage fee of the parking lot 26, a usage fee billing part 363 that charges the users of the event for the usage fee for each user, and a difference settler 364 that settles a difference obtained by subtracting the rental fee of the room 20 from sales amount of the event, for the reservation person of the room 20. That is, a participation fee for the event set by an event organizer who is the reservation person of the room 20 is included in the event holding information 422, and the usage fee billing part 363 calculates and charges the participation fee for each event participant who is the user of the room 20. A total of the participation fee calculated in this way is the sales amount of the event. On the other hand, the difference settler 364 subtracts the rental fee of the room 20 from the sales amount of the event, and settles the subtracted difference, and the fee billing part 362 charges the event organizer for the difference. Therefore, the event organizer (reservation person) does not need to pay the rental fee of the room 20, and does not need to charge the participation fee to each participant.

The message manager 37 includes a reservation person side receiver 371 that receives a message of the reservation person via the terminal device 3A of the reservation person, a user side receiver 372 that receives a message of the user via the terminal device 3B of the user, and a message viewer 373 that allows both the reservation person and the users to view the message received by the reservation person side receiver 371 and the user side receiver 372. Upon receiving the message of the reservation person from the terminal device 3A, the reservation person side receiver 371 causes the message storage 47 to store the received message as a reservation person message 471. Upon receiving the message of the user from the terminal device 3B, the user side receiver 372 causes the message storage 47 to store the received message as a user message 472. The message viewer 373 generates viewing information of the received message while allowing the reservation person message 471 and the user message 472 to be discriminated from each other, and transmits the viewing information to the terminal devices 3A and 3B of the reservation person and the user via the communicator 38.

Figure 4:
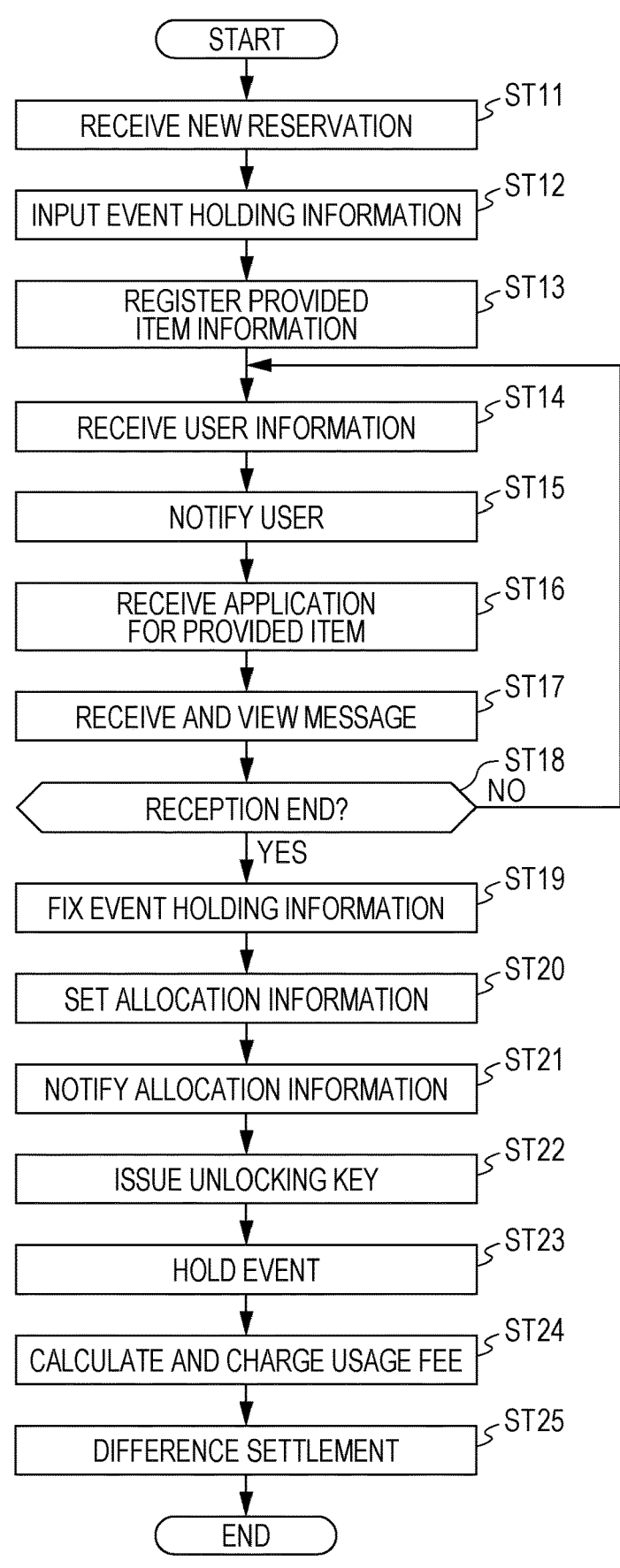
FIG. 4 is a flowchart illustrating an operation of the management server in accordance with some implementations.

FIG. 4 is a flowchart illustrating an operation of the management server of the on-demand rental facility.

The flowchart of FIG. 4 illustrates an operation procedure of the management server 1 after receiving a new reservation from the reservation person. When the reservation person receiver 311 of the reservation manager 31 receives the reservation from the reservation person (Step ST11), the control unit 30 of the management server 1 causes the event holding information storage 42 to store the reservation person information 421, the event holding information 422, and the date and time information 423 on the basis of the reservation information (Step ST12). At this time, when the reservation person uses the parking lot 26 of the building during the event, the reservation person also applies for the use of the parking lot 26 together with the reservation of the room 20, and the reservation person receiver 311 causes the event holding information storage 42 to store whether the parking lot 26 is used, in association with the reservation person information 421. Subsequently, in the control unit 30, if the provided item is registered from the terminal device 3A of the reservation person, the registration receiver 351 of the provided item manager 35 receives the registration, and causes the provided item information storage 45 to store the provided item information 451 (Step ST13). From the above, when the event holding using the room 20 is received from the reservation person, the control unit 30 displays the notification of the event to be held, on the reservation site 4, or a predetermined site of the Internet 5 on the basis of the event holding information 422, the date and time information 423, and the provided item information 451.

When the user who has viewed the notification of the event to be held applies for participation from the terminal device 3B, the control unit 30 receives the user information on the user of the event by the user receiver 312, and causes the event holding information storage 42 to store the user information 424 (Step ST14). At this time, when the user uses the parking lot 26 of the building during the event, the user also applies for the use of the parking lot 26 together with participation application, and the user receiver 312 causes the event holding information storage 42 to store whether the parking lot 26 is used, in association with the user information 424. Further, the user notifier 321 notifies the terminal device 3B of the user that the user information 424 has been received (Step ST15). Further, when the application receiver 352 receives the application for the use of the provided item related to the provided item information 451 via the terminal device 3B, the user information 424 is associated with the provided item information 451 and stored (Step ST16). Further, when the reservation person side receiver 371 and the user side receiver 372 receive the messages from the reservation person and the user via the terminal devices 3A and 3B, the message manager 37 causes the message storage 47 to store the messages as the reservation person message 471 and the user message 472, and the message viewer 373 allows both the reservation person and the users to view the messages (Step ST17). Such message exchange between the reservation person and the user may be continued until the date of the event to be held, or the message exchange can be continued by setting a predetermined period after the event has been held.

Subsequently, the control unit 30 determines whether it is time to end participation reception (Step ST18), and if the participation reception is not ended yet (NO in Step ST18), the control unit 30 repeats Steps ST14 to ST17, to receive application to participate in the event from a plurality of users, and the reservation manager 31 updates the number of people information 425. The control unit 30 ends the reception when a participation reception end time is reached (YES in Step ST18), and fixes the event holding information (Step ST19). Thus, the number of participants (the number of users) of the event is fixed, and the fixed number of people information 425 is stored in the event holding information storage 42. Subsequently, the control unit 30 causes the facility allocator 33 to set the allocation information of the room 20 to be rented on the basis of the event holding information 422, the date and time information 423, the number of people information 425, and the spatial information 412, and causes the allocation information storage 43 to store the allocation information 431 (Step ST20). Specifically, the facility allocator 33 extracts from the spatial information 412 of all the rooms 20 a room 20 that is vacant at a time of the date and time information 423 and has a size suitable for the event holding information 422 and the number of people information 425, and sets the allocation information 431 as allocating the extracted room 20. For example, the room 20 having an appropriate size is extracted from the rooms 20A to 20C.

When the room 20 is allocated to the event as described above, the control unit 30 causes the notification manager 32 to notify the terminal devices 3A and 3B of the reservation person and the user of the allocation information 431 together with the location information 411 of the building where the room 20 is located (Step ST21). Further, the control unit 30 causes the key issuer 34 to issue the unlocking key for unlocking the locking device 22 for the allocated room 20 and the unlocking key for the parking lot 26, causes the key information storage 44 to store the unlocking keys as the unlocking key information 441 and 442 for the reservation person and the user, and causes the notification manager 32 to notify the terminal device 3A of the reservation person of the reservation person unlocking key, and to notify the terminal device 3B of the user of the user unlocking key (Step ST22). Note that the unlocking keys for the reservation person and the user issued here are changed for each event so that they cannot be unlocked during a period other than the date and time of the event.

Next, at a predetermined time before the date of the event, the control unit 30 causes the provided item manager 35 to arrange a provided item requested by the user. Specifically, the provided item manager 35 delivers the provided item to a user's residence through a contracted seller or rental company, delivers the provided item to the building with the reserved room 20, or stores electronic data in a storage area of a predetermined site or cloud service that exists in the Internet 5, so that the electronic data can be viewed by the user. Subsequently, on the date of the event, the control unit 30 monitors unlocking operations of the locking device 22 for the room 20, and the parking lot 26 by the unlocking key notified to the reservation person and the user, detects that the event has started or the event has ended, and disables the unlocking key by the key issuer 34 after the event has ended (Step ST23).

When the event using the room 20 has ended as described above, the control unit 30 calculates and charges the usage fee to the reservation person and the user by the billing manager 36 on the basis of the rental fee of the room 20 to the reservation person and the participation fee for each user.

Here, first, the usage fee billing part 363 calculates the participation fee for each user on the basis of the participation fee for the event (lesson fee, lecture fee, or the like), the usage fee of the parking lot 26, a price of the provided item, or the like, and charges the participation fee to the users (Step ST24). On the other hand, the fee billing part 362 calculates for the reservation person a total of the rental fee of the room 20 and the usage fee of the parking lot 26. Subsequently, the control unit 30 causes the difference settler 364 to calculate the difference obtained by subtracting the rental fee of the room 20 from the sales amount of the event, which is the total of the participation fee for the event charged to the user, and when the difference is positive, the difference is paid to the reservation person, and when the difference is negative, the difference is charged to the reservation person (Step ST25). Further, regarding the price of the provided item charged to the user, a payment process is performed in which if a provider of the provided item is the reservation person oneself, the price is paid to the reservation person, and if the provider of the provided item is the seller, the price is paid to the seller.

From the above, processing of the management server 1 regarding the rental of the room 20 is completed, and the control unit 30 waits for reception of a next reservation. Note that in Step ST17, if it is set that the exchange of messages can be continued for a predetermined period after the event is held, the control unit 30 continuously executes only the above-described processing by the message manager 37.

According to the present embodiment as described above, the following operations and effects can be obtained.

(1) The control unit 30 of the management server 1 includes the reservation person common key setting part 341 that sets the reservation person unlocking key common to the room 20 and the parking lot 26 associated with the event holding information 422 and the reservation person information 421, and the reservation person key issuer 342 that issues the reservation person unlocking key set by the reservation person common key setting part 341 to the reservation person, so that the reservation person can unlock the room 20 and the parking lot 26 by using the reservation person unlocking key, and convenience for the reservation person can be improved. Thus, the reservation person does not have to separately receive the unlocking key corresponding to the room 20 and another unlocking key corresponding to the parking lot 26, and can relatively easily reserve the facility, and operational efficiency of the facility can be improved.

(2) The control unit 30 of the management server 1 includes the fee billing part 362 that charges the reservation person for a total usage fee of the room 20 and the parking lot 26, so that the reservation person can pay the total usage fee of the room 20 and the parking lot 26 in a lump sum.

(3) The control unit 30 of the management server 1 includes the user common key setting part 343 that sets the user unlocking key common to the room 20 and the parking lot 26 associated with the event holding information 422 and the user information 424, and the user key issuer 344 that issues the user unlocking key set by the user common key setting part 343 to the user, so that the reservation person can unlock the room 20 and the reservation person parking lot 26 by using the reservation person unlocking key, and the user can unlock the room 20 and the user parking lot 26 by using the user unlocking key.

(4) The control unit 30 of the management server 1 includes: the user receiver 312 that receives the user information 424 on the user of the event to be held by using the room 20, to cause the storage unit 40 to store the user information 424; and the user notifier 321 that notifies the user that the user information 424 has been received, so that the user can directly register the user information 424 for the event to be held using the room 20. Thus, the reservation person does not need to determine the number of users at the time of reservation, and can relatively easily reserve the facility even when the number of users cannot be predicted. Further, when the user applies for participation in the event via the terminal device 3B, the user can receive the notification from the user notifier 321 of the management server 1. Therefore, the on-demand rental facility can improve the convenience for both the reservation person and the users.

(5) The control unit 30 of the management server 1 includes the location information notifier 322 that transmits to the user the location information 411 related to the room 20 and the building 2 included in the event holding information 422 stored in the event holding information storage 42, so that the user can easily reach the building 2 and the room 20 on the basis of the location information 411.

(6) The control unit 30 of the management server 1 includes the registration receiver 351 that receives the registration of the provided item information 451 from the reservation person, and the application receiver 352 that receives the application for the use of the provided item from the user, so that the reservation person can register the provided item to be provided to the user, and the user can apply for the use of the provided item.

(7) The control unit 30 of the management server 1 includes the message viewer 373 that allows both the reservation person and the users to view the message received by the reservation person side receiver 371 and the user side receiver 372, so that the reservation person and the user can interact with each other by exchanging the messages via the management server 1.

(8) The control unit 30 of the management server 1 includes the usage fee billing part 363 that charges the usage fee of the event for each user with respect to the users of the event to be held using the room 20, so that the reservation person can save time and effort of individually billing the user.

(9) The control unit 30 of the management server 1 includes the difference settler 364 that settles the difference obtained by subtracting the usage fee of the room 20 from the sales amount of the event, for the reservation person of the event to be held using the room 20, so that the reservation person can save the time and effort of individually billing the user and the time and effort of paying the usage fee of the room 20.

(10) The control unit 30 of the management server 1 includes the facility allocator 33 that sets the allocation information 431 of the room 20 on the basis of the event holding information 422 and the number of people information 425, and causes the user notifier 321 to notify the user of the set allocation information 431, so that it is possible to allocate the room 20 having a suitable size according to the number of users. Therefore, the reservation person can relatively easily reserve the room 20 even when the number of users cannot be predicted at the time of reservation, and can receive the allocation of the room 20 of an appropriate scale even when the number of users changes. Thus, the on-demand rental facility can receive a positive reservation from the user, and it is expected that the number of repeated users will increase due to improvement of usage satisfaction, so that the operational efficiency can be improved.

(11) The facility allocator 33 of the control unit 30 allocates at least a part of all available rooms 20 and updates the allocation information 431 on the allocated room 20, so that it is possible to reduce labor costs as compared with a case where the room 20 is manually allocated, and to immediately update the allocation information 431 and notify the user, when the number of users changes.

ALTERNATIVE IMPLEMENTATIONS

Note that the present disclosure is not limited to the above embodiment, and modifications, improvements, and the like within a range in which an object of the present disclosure can be achieved are included in the present disclosure.

For example, in the above embodiment, a case in which the room (space) 20 of the building 2 is rented as the on-demand rental facility is exemplified, but the facility to be rented in the on-demand rental facility is not limited to the conference room, the training room, and the like, and may be a tennis court, a baseball field, a stadium, a parking lot, or the like, which is an outdoor space, or a karaoke room, a rental office, a reading space, or the like. Further, the on-demand rental facility is not limited to a facility attached to real estate such as the building 2, and may be movable property such as various goods, or a moving object such as an automobile or a ship may be rented as the facility.

In the above embodiment, a case where the management server 1 includes the server device that is connected to the terminal device 3, the communication terminal device 23, and the like, via the Internet 5 which is the communication line is exemplified, but the management servers are not limited to that including such a centralized management type server device. That is, the management server may be a distributed management type server, for example, a server using a distributed transaction ledger typified by blockchain can be used, and any server that can manage the reservation information, and can transmit and receive various commands to and from the terminal device 3 and the like, and process the commands can be used. Further, in the above embodiment, the management server 1 and the reservation site 4 are separately provided and connected to each other via the Internet 5, but the present disclosure is not limited to this, and the management server 1 and the reservation site 4 may be provided in a single site, or a function of the management server and a function of the reservation site may be implemented by a plurality of devices distributed on the Internet.

In the above embodiment, the control unit 30 of the management server 1 includes the facility allocator 33, and the facility allocator 33 automatically updates the allocation information 431, however, the allocation information 431 may not be automatically updated by such a facility allocator 33, but may be manually updated by the administrator or the like. Further, the facility allocator 33 of the control unit 30 allocates a part of all the rooms 20 in the same building 2 when updating the allocation information 431 according to change in the number of users, but the present disclosure is not limited to this, and a room 20 of another building 2 existing in the vicinity may be allocated. As such another building 2, an owner and the administrator may be the same or different, and it may be an operation form in which a plurality of owners (administrators) cooperates to rent the rooms 20 of the building 2.

Further, in the above embodiment, the control unit 30 of the management server 1 includes the location information notifier 322 that transmits the location information 411 related to the room 20 and the building 2 included in the event holding information 422 to the user terminal device 3B, however, the location information 411 may not be transmitted to the user terminal device 3B, but may be posted on a predetermined site, or may be displayed by the message viewer 373. Further, the control unit 30 includes the registration receiver 351 that receives the registration of the provided item information 451 from the reservation person and the application receiver 352 that receives the application for the use of the provided item from the user, but functions related to the registration and the application of the provided item may be provided not in the management server 1 but in an external server (for example, a site of the seller) or the like, and the management server 1 may simply notify the user of an access procedure to the external server. Furthermore, the control unit 30 includes the message viewer 373 that allows both the reservation person and the users to view the message received by the reservation person side receiver 371 and the user side receiver 372, but functions related to the reception and the viewing may be provided not in the management server 1 but in the external server or the like, and the management server 1 may simply notify the user of the access procedure to the external server.

Further, in the above embodiment, the control unit 30 of the management server 1 includes the usage fee billing part 363 that charges the usage fee of the event for each user with respect to the users of the event to be held using the room 20, but a function related to billing of the usage fee of the event may be provided not in the management server 1 but in the external server or the like. Furthermore, the control unit 30 includes the difference settler 364 that settles the difference obtained by subtracting the usage fee of the room 20 from the sales amount of the event, for the reservation person who is the event organizer, but such a settlement function may be omitted, or may be provided in the external server or the like.

Further, in the above-described embodiment, as the facility rented by the on-demand rental facility, although a case has been illustrated where the first facility is the room 20, the second facility is the reservation person parking lot 26, and the third facility is the user parking lot 26, the first to third facilities are not limited to a combination in the above-described embodiment. For example, the first facility may be the real estate such as the building or the facility, and the second and third facilities may be moving bodies such as an automobile, and conversely, the first facility may be the moving body, and the second and third facilities may be the real estate. Further, the first facility and the second facility may be the real estate, and the third facility may be the goods including the moving body, while the first facility and the second facility may be the goods including the moving body, and the third facility may be the real estate. That is, the first facility is one that can be unlocked by the common unlocking key when the reservation person makes a reservation and the user uses it, and the second and third facilities are ones that can be unlocked by individual unlocking keys by the reservation person and the user, and these facilities can be configured by combining arbitrarily selected ones.

As described above, the present disclosure can be suitably used for the on-demand rental facility that can improve the operational efficiency of the facility by improving the convenience for both the reservation person and the user.

The foregoing description has been described with reference to specific implementations. However, the illustrative discussions above are not intended to be exhaustive or to limit the claims to the precise forms disclosed. Many variations are possible in view of the above teachings. The implementations were chosen and described to best explain principles of operation and practical applications, to thereby enable others skilled in the art.

The various drawings illustrate a number of elements in a particular order. However, elements that are not order dependent may be reordered and other elements may be combined or separated. While some reordering or other groupings are specifically mentioned, others will be obvious to those of ordinary skill in the art, so the ordering and groupings presented herein are not an exhaustive list of alternatives.

As used herein: the singular forms "a", "an," and "the" include the plural forms as well, unless the context clearly indicates otherwise; the term "and/or" encompasses all possible combinations of one or more of the associated listed items; the terms "first," "second," etc. are only used to distinguish one element from another and do not limit the elements themselves; the term "if" may be construed to mean "when," "upon," "in response to," or "in accordance with," depending on the context; and the terms "include," "including," "comprise," and "comprising" specify particular features or operations but do not preclude additional features or operations.

The invention claimed is:

1. An on-demand rental facility in which a usage time is set and a facility is rented, wherein the facility comprises at least a first facility and a second facility different from the first facility, the on-demand rental facility comprises a management server for managing information on the first facility and the second facility, and the management server is connected via a communication line to a reservation person input means that receives information input from a reservation person of the first facility and the second facility to the management server, and comprises:

a reservation manager that receives a reservation from the reservation person via the reservation person input means;

a storage that stores reservation information on the reservation person and reservation date and time of the first facility and the second facility received by the reservation manager;

a reservation person common key setting part that sets a reservation person unlocking key common to the first facility and the second facility associated with the reservation information, wherein the reservation person unlocking key includes a first key portion and a second key portion, wherein:

the first facility is configured to unlock based on the first key portion independent of the second key portion; and the second facility is configured to unlock based on the second key portion; and a reservation person key issuer that issues the reservation person unlocking key set in the reservation person common key setting part to the reservation person; wherein:

the management server is further connected via a communication line to a user input means that receives information input to the management server by a user who is a user of the first facility related to the reservation information stored in the storage and is different from the reservation person, the reservation manager further comprises:

a reservation person receiver that receives event holding information on a reservation date and time and a reserved location of an event to be held using the first facility from the reservation person via the reservation person input means, and causes the storage to store the received event holding information; and a user receiver that receives user information on the user of the event related to the event holding information via the user input means, to cause the storage to store the user information, and the management server further comprises a user notifier that notifies the user that the user information has been received.

2. The on-demand rental facility according to claim 1, wherein the management server comprises a fee billing part that charges the reservation person for a total usage fee of the first facility and the second facility.

3. The on-demand rental facility according to claim 1, wherein the facility comprises a third facility different from the first facility and the second facility, and the management server causes the storage to store user information on a user of the third facility by receiving a reservation of the third facility via the user input means, and comprises:

a user common key setting part that sets a user unlocking key common to the first facility and the third facility associated with the reservation information and the user information; and a user key issuer that issues the user unlocking key set in the user common key setting part to the user.

4. The on-demand rental facility according to claim 1, wherein the management server comprises a location information notifier that notifies the user of location information related to a reserved location included in the event holding information stored in the storage.

5. The on-demand rental facility according to claim 1, wherein the management server comprises:

a registration receiver that receives registration of provided item information on provided item to be provided at the event related to the event holding information via the reservation person input means, to cause the storage to store the provided item information; and an application receiver that receives an application for use of the provided item related to the provided item information via the user input means.

6. The on-demand rental facility according to claim 1, wherein the management server comprises:

a reservation person side receiver that receives a message of the reservation person via the reservation person input means;

a user side receiver that receives a message of the user via the user input means; and a message viewer that allows both the reservation person and the user to view the message received by the reservation person side receiver and the user side receiver.

7. The on-demand rental facility according to claim 1, wherein the management server comprises a usage fee billing part that charges a usage fee for each user with respect to users of the event related to the event holding information.

\* \* \* \* \*